US010387958B2

(12) United States Patent
Dennelly et al.

(10) Patent No.: US 10,387,958 B2
(45) Date of Patent: Aug. 20, 2019

(54) SELF-DIRECTED STYLE BOX PORTFOLIO ALLOCATION SELECTION APPARATUSES, METHODS AND SYSTEMS

(71) Applicant: FMR LLC, Boston, MA (US)

(72) Inventors: Keith Dennelly, Hingham, MA (US); Mihir Shah, Burlington, MA (US); Madhusudana Chalamani, South Grafton, MA (US); Vineet Nene, Hopkinton, MA (US)

(73) Assignee: FMR LLC, Boston, MA (US)

( * ) Notice: Subject to any disclaimer, the term of this patent is extended or adjusted under 35 U.S.C. 154(b) by 570 days.

(21) Appl. No.: 14/737,030

(22) Filed: Jun. 11, 2015

(65) Prior Publication Data
US 2016/0364800 A1    Dec. 15, 2016

(51) Int. Cl.
    *G06Q 40/06*    (2012.01)
(52) U.S. Cl.
    CPC .................................. *G06Q 40/06* (2013.01)
(58) Field of Classification Search
    CPC ........ G06Q 40/06; G06Q 40/04; G06Q 40/00; G06F 3/04842; G06F 3/0486
    See application file for complete search history.

(56) References Cited

U.S. PATENT DOCUMENTS

| | | | | |
|---|---|---|---|---|
| 5,918,217 | A * | 6/1999 | Maggioncalda | ... G06Q 30/0601 705/36 R |
| 7,177,831 | B1 * | 2/2007 | O'Shaughnessy | ... G06Q 20/102 705/30 |
| 2005/0010516 | A1 * | 1/2005 | Ivanov | ................... G06Q 40/06 705/36 R |
| 2007/0282759 | A1 * | 12/2007 | Devries | ................. G06Q 40/06 705/36 R |
| 2012/0079431 | A1 * | 3/2012 | Toso | ................. G06F 17/30554 715/836 |

* cited by examiner

*Primary Examiner* — Namrata Boveja
*Assistant Examiner* — Carol A See
(74) *Attorney, Agent, or Firm* — Hanchuk Kheit LLP; Walter G. Hanchuk

(57) ABSTRACT

The Self-Directed Style Box Portfolio Allocation Selection Apparatuses, Methods and Systems ("PAS") transforms portfolio allocation selection inputs via PAS components into trade orders and portfolio allocation confirmation outputs. The PAS determines a style box grid corresponding to current fund allocations of a fund portfolio of a client, and a fund listing corresponding to the style box grid. The PAS provides the style box grid and the fund listing to a display of a computing device of the client. The PAS receives an allocation selection command from the computing device of the client, the allocation selection command generated via at last one of the style box grid and the fund listing on the display. The PAS determines a portfolio rebalancing based on the allocation selection command, and updates to the style box grid and the fund listing according to the portfolio rebalancing. The PAS then provides the update to the style box grid and the fund listing to the display of the computing device of the client.

54 Claims, 12 Drawing Sheets

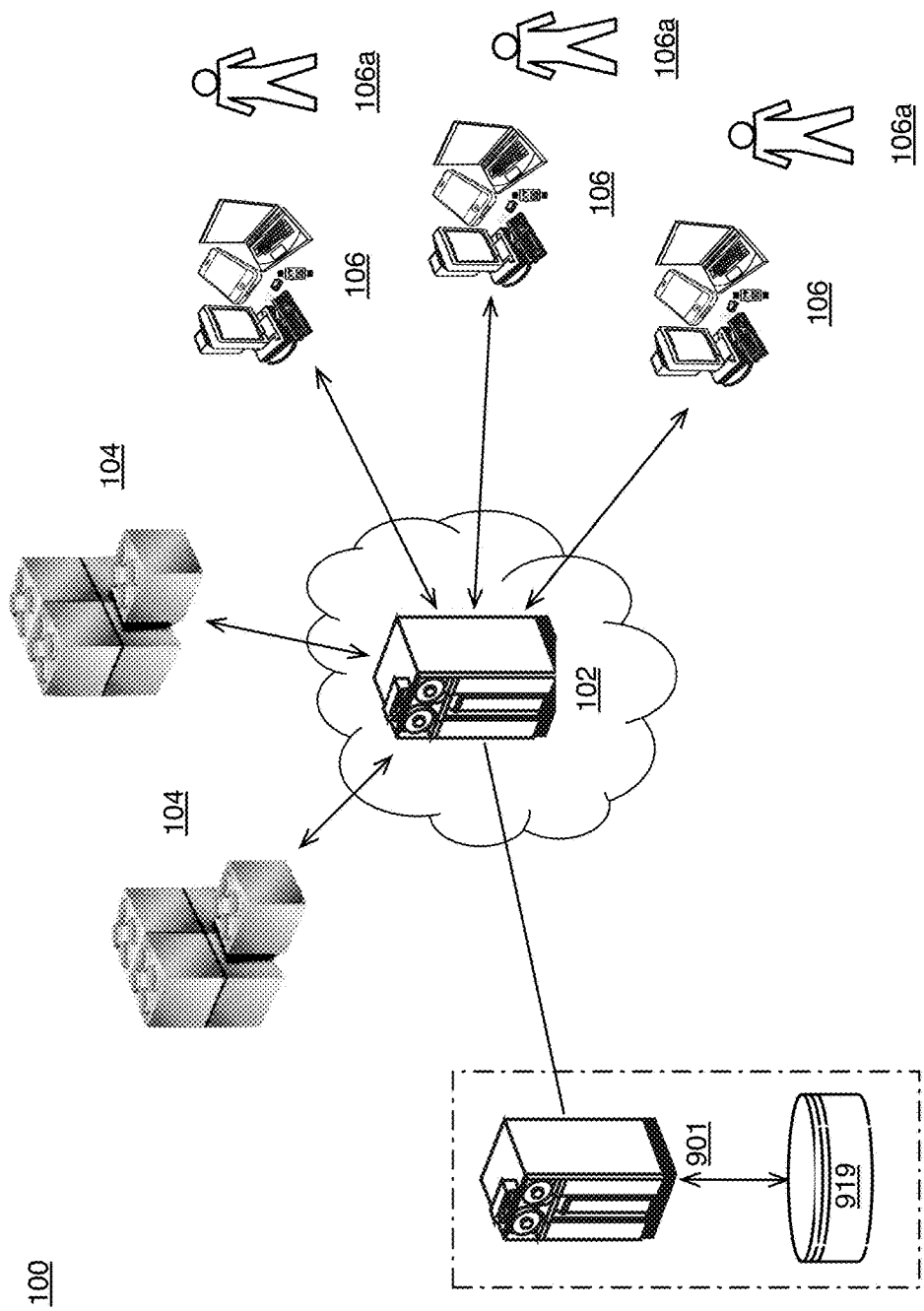
FIG. 1 - PAS NETWORK ENVIRONMENT

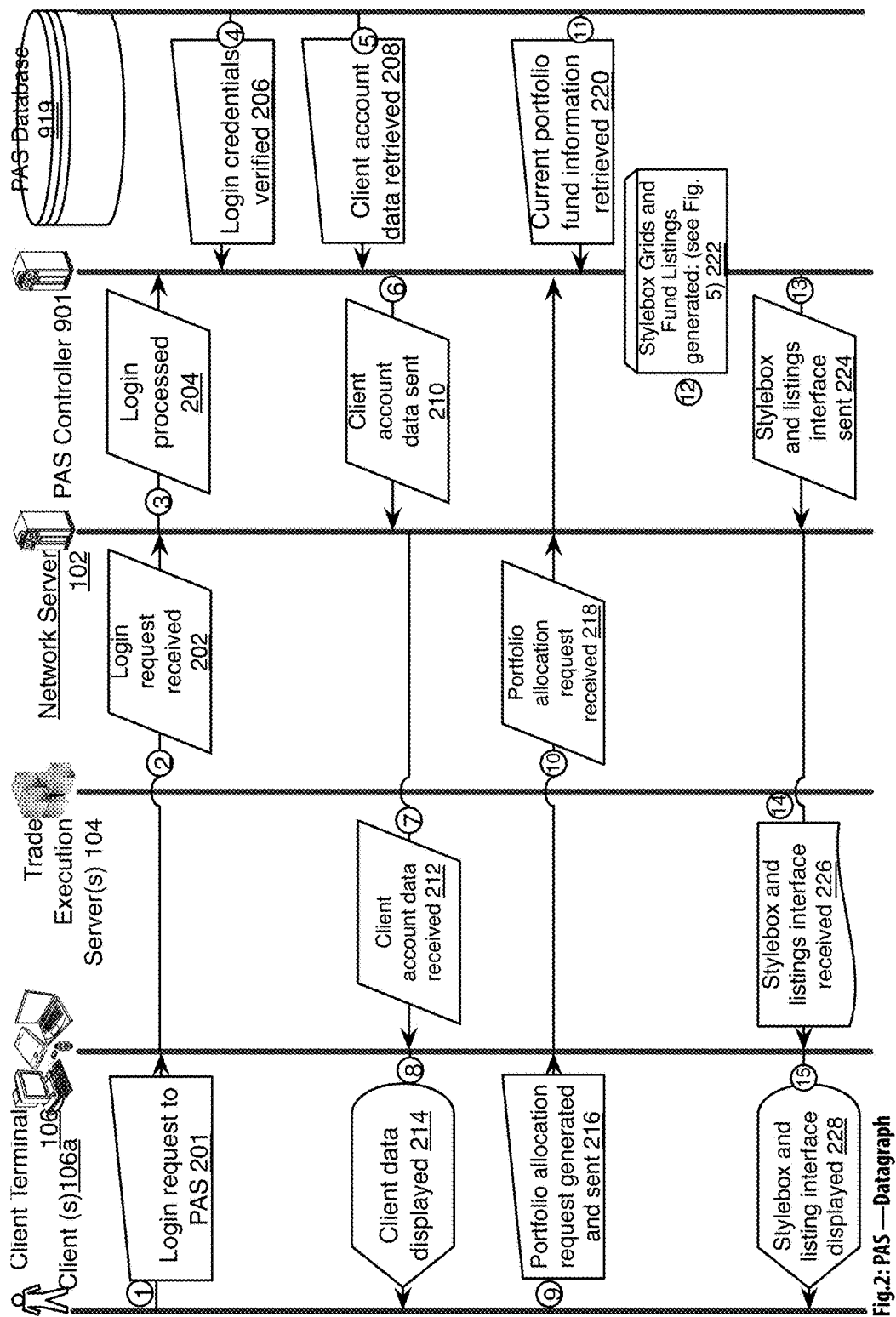
Fig.2: PAS — Datagraph

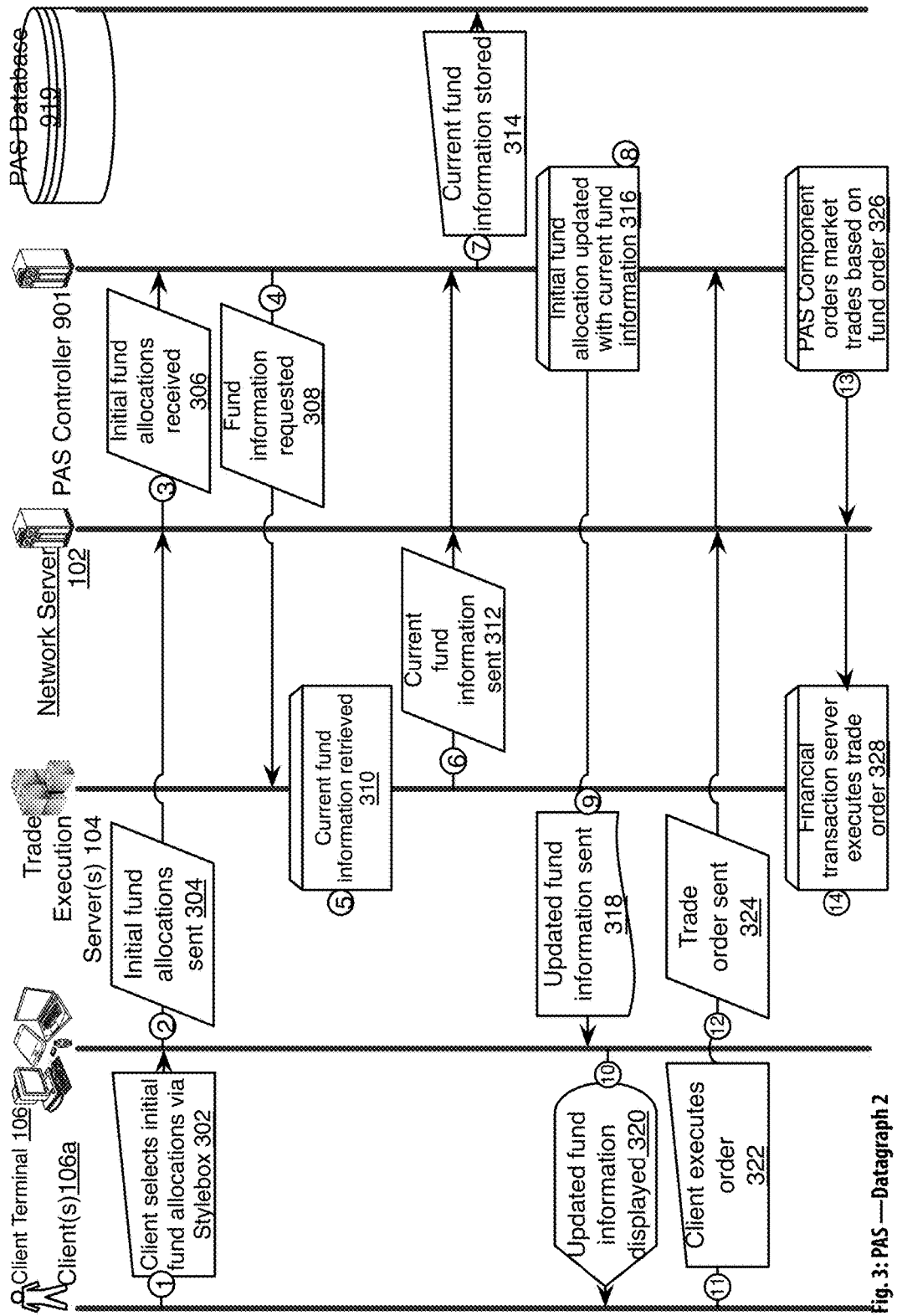
Fig. 3: PAS—Datagraph 2

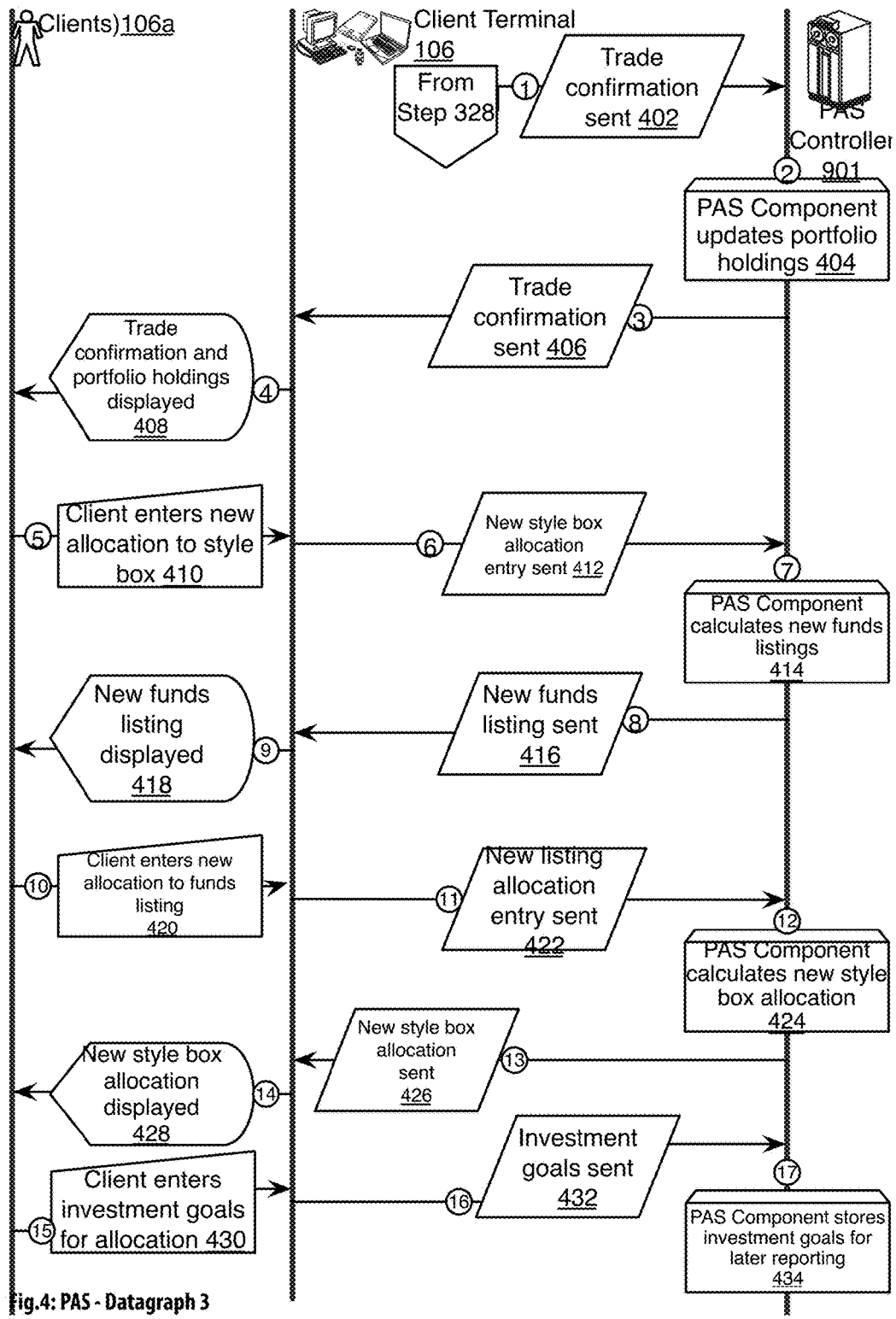
Fig.4: PAS - Datagraph 3

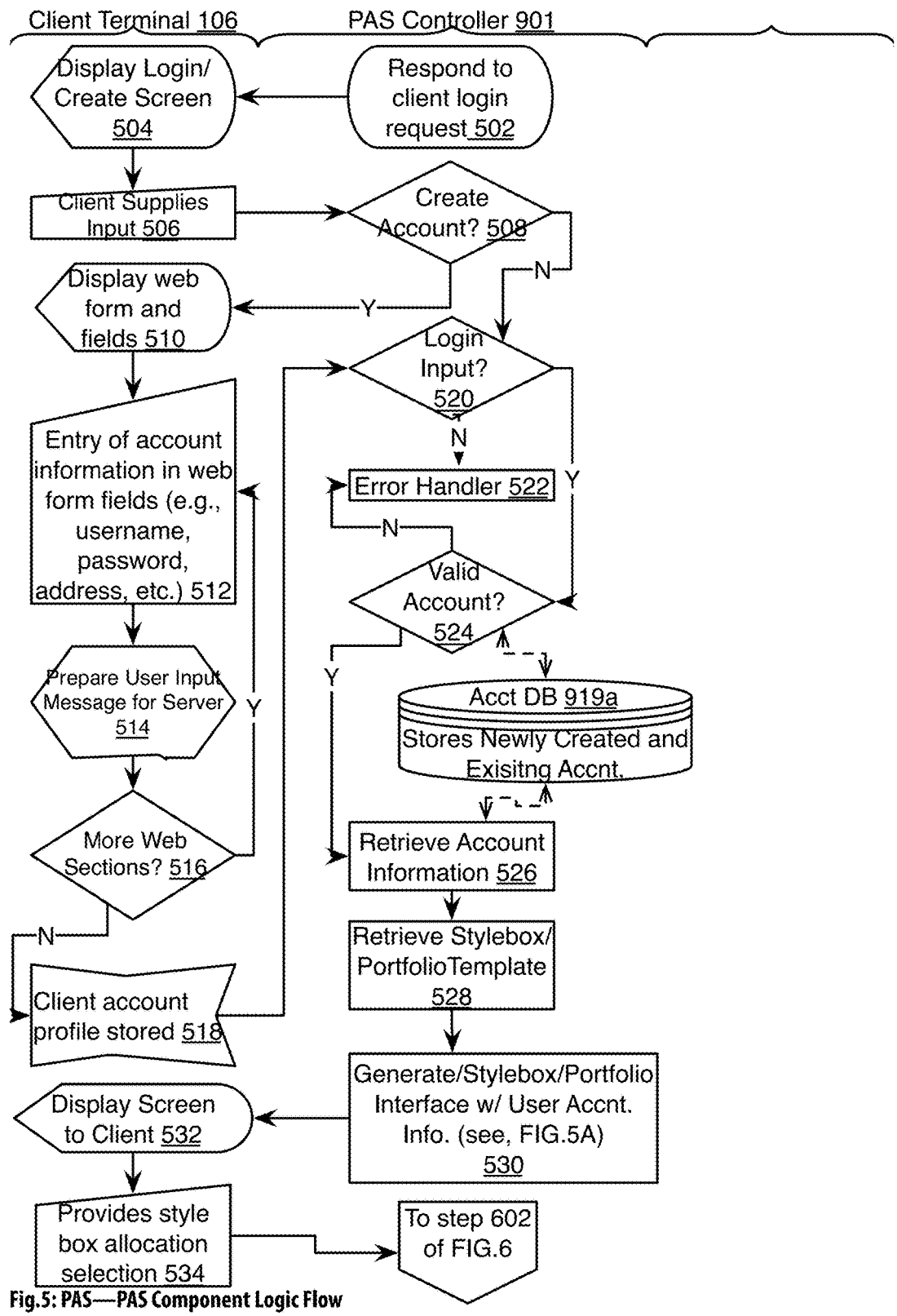
Fig.5: PAS—PAS Component Logic Flow

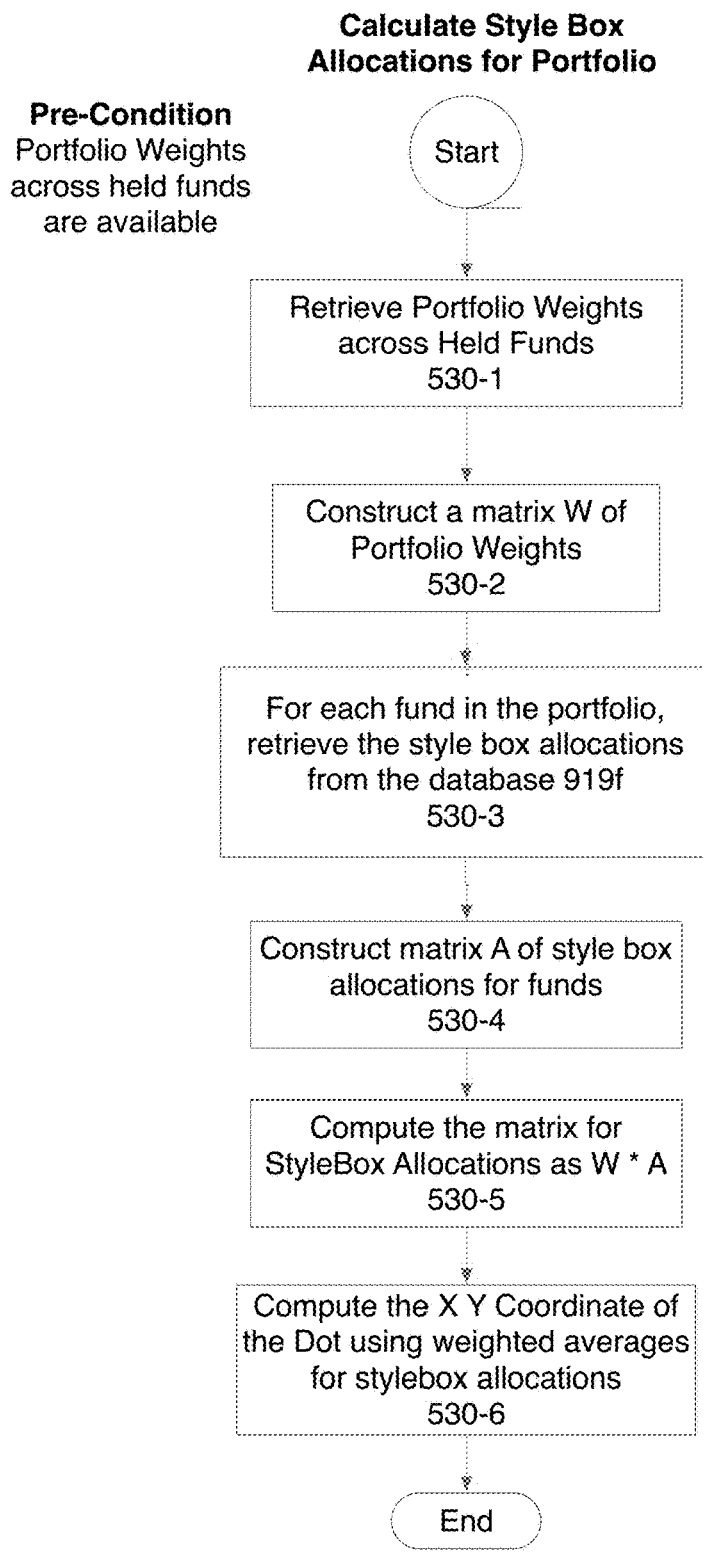
Fig.5a: Grid Population Flow

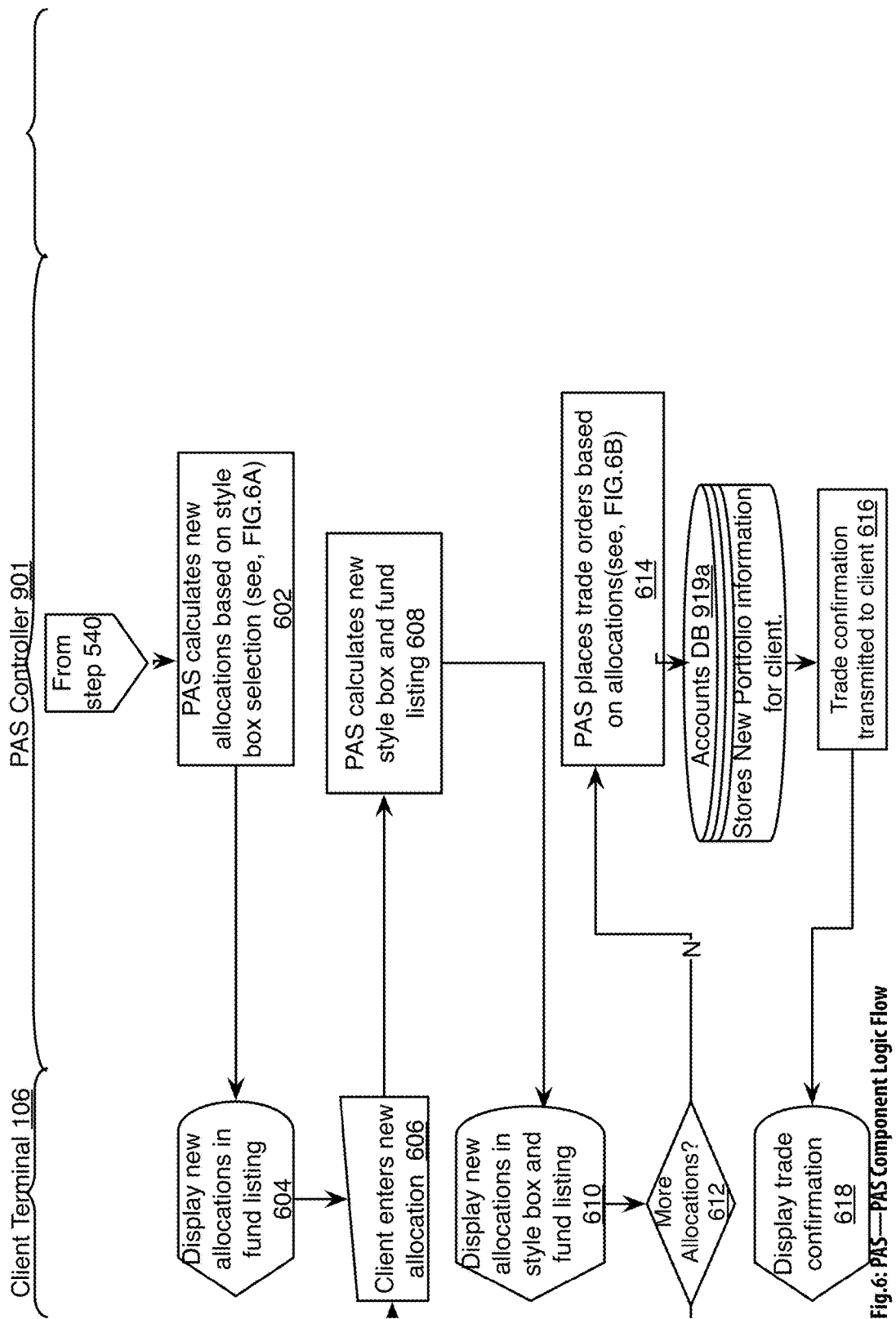
Fig.6: PAS—PAS Component Logic Flow

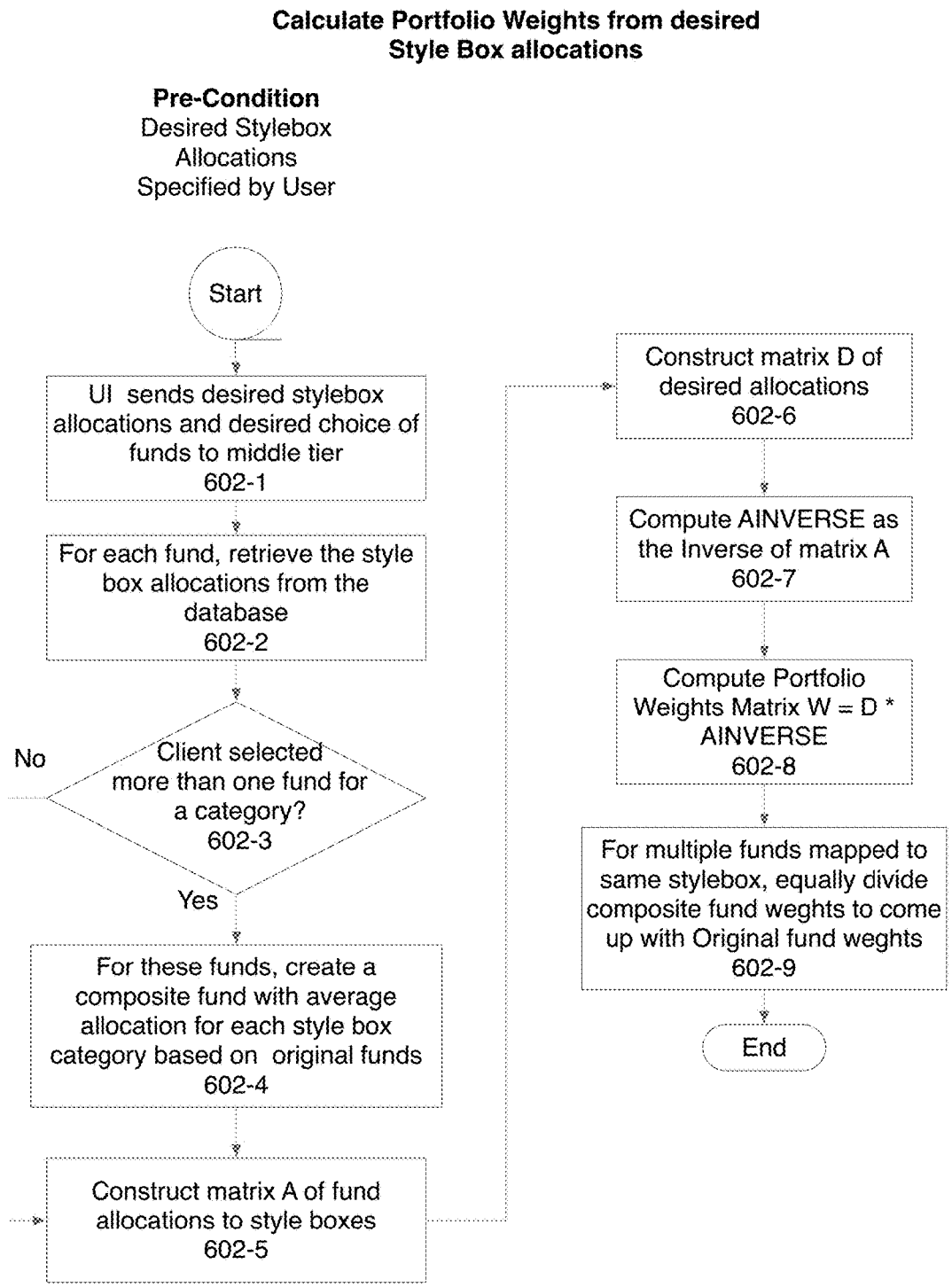
Fig.6A: Weight Calculations Flow

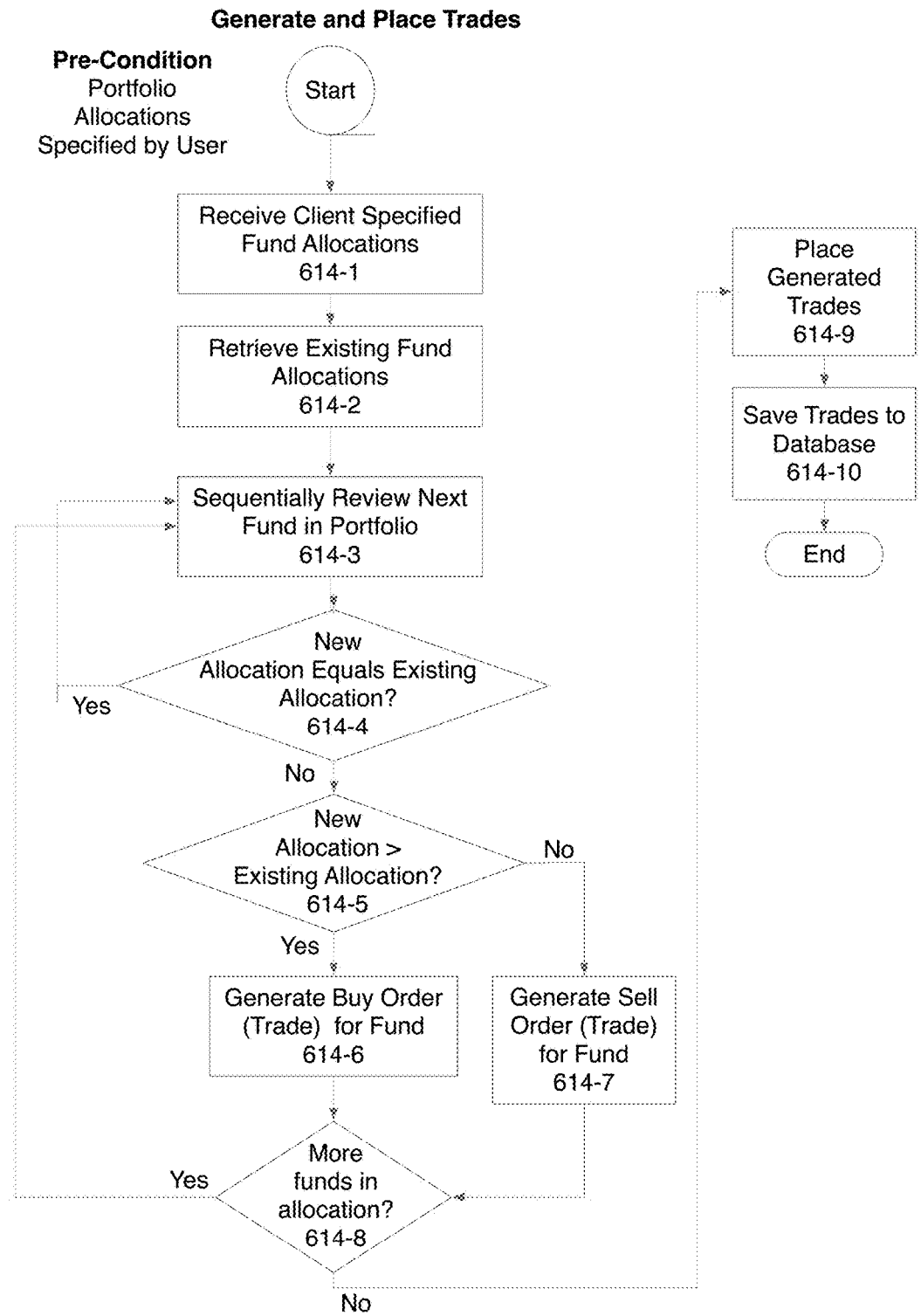
Fig.6B: Allocated Trade Order Flow

700

Create Portfolio: Step 1 of 2

Portfolio Name: [StyleBox Portfolio] *

Portfolio Theme: [Economic Cycle - Early Growth ▼]

Start with:
● Benchmark
○ Pre-defined Model ⓘ

Rebalance every: ⓘ [3 ▼] Months

Select Investment Type:
○ Sector-based
● M.star Style Box-based

Portfolio Comments:

Cancel    Next ▸

* Enter required values

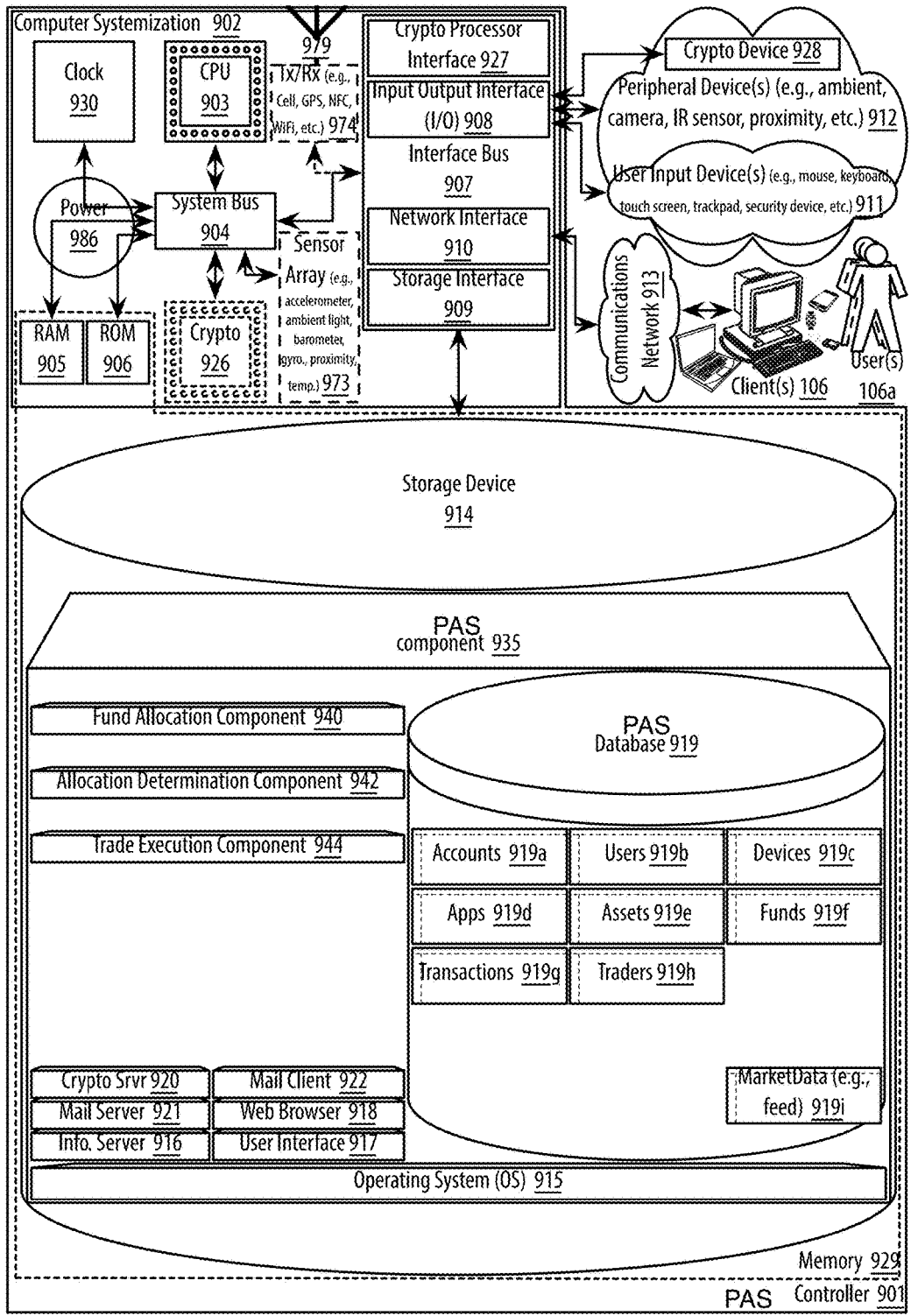
Fig.9: PAS - Controller

SELF-DIRECTED STYLE BOX PORTFOLIO ALLOCATION SELECTION APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address Electronic Communications, and more particularly, include Self-Directed Style Box Portfolio Allocation Selection Apparatuses, Methods and Systems.

As such, the present innovations include (at least) the following distinct areas, including: Electronic communications involving condition responsive indicating systems that are responsive to a particular sequence of conditions (with a suggested Class/Subclass of 344/523).

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

People own all types of assets, some of which are secured instruments to underlying assets. People have used exchanges to facilitate trading and selling of such assets. Computer information systems, such as NAICO-NET, Trade*Plus and E*Trade allowed owners to trade securities assets electronically.

BRIEF DESCRIPTION OF THE DRAWINGS

Appendices and/or drawings illustrating various, non-limiting, example, innovative aspects of the Self-Directed Style Box Portfolio Allocation Selection Apparatuses, Methods and Systems (hereinafter "PAS") disclosure, include:

FIG. 1 shows a block diagram illustrating embodiments of a network environment for the PAS;

FIGS. 2-4 show a datagraph diagram illustrating embodiments of a portfolio allocation selection process for the PAS;

FIGS. 5-6B show logic flow diagrams illustrating embodiments of a portfolio allocation selection process for the PAS;

FIGS. 7-8 show screenshot diagrams illustrating embodiments of portfolio allocation selection screens for the PAS; and FIG. 9 shows a block diagram illustrating embodiments of a PAS controller;

DETAILED DESCRIPTION

Figure 8:
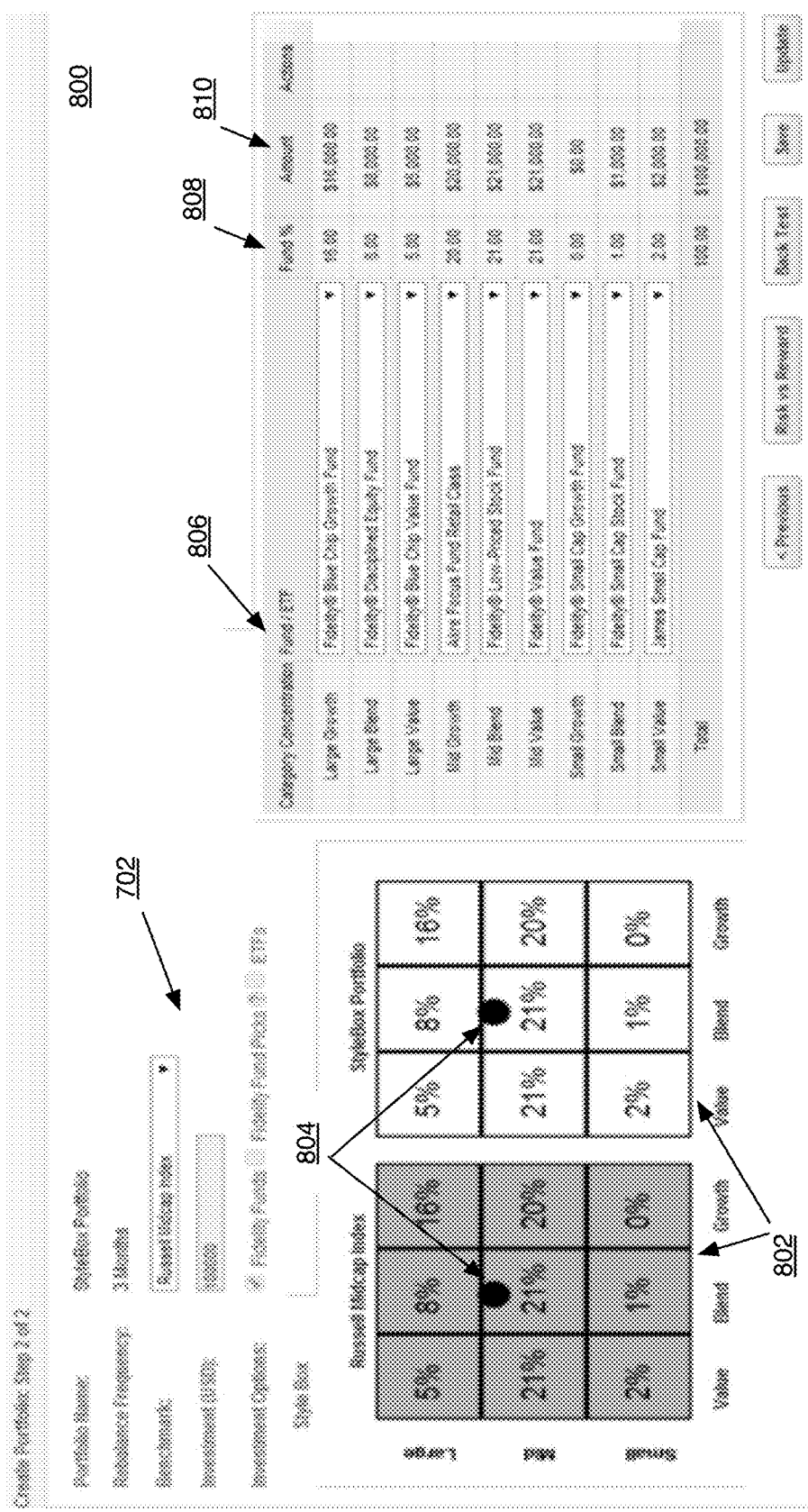

The Self-Directed Style Box Portfolio Allocation Selection Apparatuses, Methods and Systems (hereinafter "PAS") transforms portfolio allocation selection inputs, via PAS components (e.g., Fund Allocation Component, Allocation Determination Component, and Trade Confirmation Component, etc.), into trade orders and portfolio allocation confirmation outputs. The PAS components, in various embodiments, implement advantageous features as set forth below.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

Introduction

As online trading technology evolves, some features and functionalities of the graphical user interface (GUI) between brokers and client traders remain little changed. Namely, a client wishing to enact a trade, or a series of trades, is asked to input trade information into a series of fields, including the equity name or symbol, share amount and other market order options. This may lead to faulty or incorrect trade orders being placed in various cases due to human error. In addition, while access to equities and other trading has been made easier by the Internet, many clients do not have sophisticated understanding of the markets or the means to constantly monitor their investments, which may be required to achieve their investing goals. The solutions presented herein address and cure these and other associated problems in the existing arts.

PAS allows Clients, such as investors, to construct, back-test and maintain customized portfolios holding mutual funds and exchange traded funds (ETFs) as building blocks. The portfolio allocation selection interface of the PAS provides an alternative approach that allows Clients to construct and maintain customized portfolio according to selected allocations using style boxes, such as MORNINGSTAR-type style boxes.

Clients may research, build and maintain an investment strategy using customized style box allocations for a fund portfolio. PAS further allows Clients to research allocation strategies through back-testing. In such case, an allocation selected using style boxes would get tracked, and clients would be given an opportunity to periodically re-balance using a click of a button in order to attempt to maintain or pursue the investing goals of the allocation. The PAS will then maintain the style-box-selected allocation through additional investments and/or withdrawals. The PAS uses one or more algorithms to derive appropriate mutual fund/ETF weights in a portfolio in response to the style box allocation selected by a Client.

Clients can model allocation across style boxes by either customizing the allocation offered by an index, or by choosing a model allocation and, optionally, customizing it. For a strategy based on index allocation, the customization can be done by moving a "Portfolio Dot' as may be presented by the PAS in a graphical user interface (GUI) comprising a style-box.

Advanced analytics are available to back-test a Client's strategy over a period of time, against the historical equity price data, as well as other data on prior economic cycles and market indicators. Using this analytics capability, the Client can compare the performance and risk of the custom portfolio with indices, and other model strategies against the backdrop of economic cycles and fundamentals. Clients can also get an insight into what contributed to or were deterrents of the overall performance.

Once money is invested into a portfolio in the PAS, it can be viewed as a single unit in the Client's holdings, with an ability to drill down into individual fund constituents and holdings. Clients can set monitors to track deviations from the target allocation strategy or established investment goals, and can receive notifications in case of deviations. Clients can then choose to re-balance the portfolio with a single click of a button.

The Client can add and withdraw monetary funds from the custom portfolio, where the PAS will re-balance to maintain the target allocation strategy. The PAS further allows Clients to select a model market index as a guide to selecting style box entries for establishing a portfolio. When a client express a desired allocation of investments based on two or more dimensions of categories of funds, the PAS will automatically establish funds to be bought and the allocation of monetary investment among such funds with algorithmically-determined fund weights for the desired portfolio allocation. The Client is also allowed to back-test an entered portfolio allocation against historical market data or the like before any trades are executed.

PAS

FIG. 1 shows a block diagram illustrating embodiments of the network environment 100 of the PAS.

The network environment 100 may include a PAS Server 901, the functions and components of which described in detail below with respect to FIG. 9. The PAS Server 901 may comprise one or many servers, which may collectively be included in the PAS System.

The network environment 100 may further include a PAS Database 919, which may be provided to store various information used by the PAS Server 901 including client portfolio data, financial transaction data, and any other data as described, contemplated and used herein.

The network environment 100 may further include a Network Interface Server 102, which, for example, enables data network communication between the PAS Server 901, Trade Execution Server(s) 104, and Client Terminal(s) 106, in accordance with the interactions as described herein.

The one or more Client Terminals 106 may be any type of computing device that may be used by Clients 106a to connect with the PAS Server 901 over a data communications network. Clients 106a, in turn, may be investors who hold investment accounts with financial or investing institutions, as described further herein.

The Trade Execution Server(s) 104 may be operated by the financial or investment institution offering the PAS System. Alternatively, or in addition thereto, the Trade Execution Server(s) 104 may include Trade Execution servers of other financial or investment institutions that process monetary payments, deposits, withdraws and market trade orders, such as credit card companies, banks, credit unions, investment brokers, and payment clearinghouses. Any or all types of Trade Execution servers may be employed in conjunction with the PAS System in order to accomplish the functionalities described herein. The ability to research, construct and institute a portfolio allocation by style box selection represents a technological advancement in the field of network communications by which such network communications are efficiently harnessed to quickly and correctly implement a trade allocation selected by a Client based solely on the Client's strategy as selected by, for example, portfolio dots provided with the style-box user interface.

The servers and terminals represented in FIG. 1 cooperate via network communications hardware and software to initiate the collection of data for use in the PAS system, the processes involving which will now be described in more detail.

Turning now to FIGS. 2-4, therein are depicted a datagraph diagram illustrating exemplary embodiments of a portfolio allocation selection process performed via the PAS. With reference to FIG. 2, an exemplary portfolio allocation selection process commences at step 201, where a Client 106(a) using Client Terminal 106 accesses the PAS Controller 901 via network Server 102 to transmit a Login Request. The Login Request may be in the form of a username/password entry that is transmitted to the PAS Controller 901 for validation. The Login Request may be performed by any of a variety of means well-known in the art, including, without limitation, biometric recognition, and other known manners of client identification validation.

Next, at step 202, the Login Request is received by Network Server 102 over a data communications network, such as, but not limited to, the Internet. The Login Request is then received and processed by the PAS Controller 901 (step 204).

In one embodiment, the client may provide the following example Login Request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
```

```
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
            <app_installed_flag>true</app_installed_flag>
            <app_name>PAS.app</app_name>
            <app_version>1.0 </app_version>
            <app_webkit_name>Mobile Safari</client_webkit_name>
            <client_version>537.51.2</client_version>
        </client_details>
        <client_details> //iOS Client with Webbrowser
            <client_IP>10.0.0.123</client_IP>
            <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
        </client_details>
        <client_details> //Android Client with Webbrowser
            <client_IP>10.0.0.123</client_IP>
            <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
        </client_details>
        <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <login_data>
            <adeviceType>mobile</deviceType>
            <userName>johndoe</userName>
            <passWord>abc123</passWord>
            <loginRemember>n</loginRemember>
        </login_data>
</auth_request>
```

Continuing to step 206, the Login Request containing login credentials received from the Client Terminal 106 will next be verified by the PAS Controller 901. The PAS Controller 901 may, for example, compare a received username and password against stored identity information, as may be maintained in PAS Database 919, a password vault, or other useful identity verification system.

When the login credentials are successfully verified, the PAS Controller 901 retrieves client account data by querying for the client's account data from the PAS Database 919. Such client account data may include, inter alia, fund portfolio information of the client including: a number of mutual funds, ETF funds and other funds, equities or monetary amounts held by the client, the monetary value of each such fund held, and the percentage of the portfolio value represented by each fund.

An example of a query to the PAS Database in order to retrieve client fund information may take the following form:

```
<?PHP
header('Content-Type: text/plain');
mysql_connect("254.93.179.112",$DBserver,$password); // access
database server
mysql_select_db("JOHNDOEACCTINFO.SQL"); // select database table
to search
//create query for token arbitrators
$query = "SELECT account_id, file_location, file_format FROM
AcctTemplate WHERE
acct_type LIKE '%' $useraccttype";
$result = mysql_query($query); // perform the search query
mysql_close("JOHNDOEACCTINFO.SQL"); // close database access
?>
```

The retrieved client account data is next sent to the Client Terminal 106 via network server 102 (step 210). Such account data may be encrypted or otherwise coded prior to transmission over the data communications network. The client account data is the received by the Client Terminal 106 (step 212) and displayed on a visual display device thereof to the Client 106(*a*) (step 214).

Next, at step 216, the Client 106(*a*) may generate a request for the client's current portfolio allocation by entering such a request into the Client Terminal 106. The request may then be sent from the Client Terminal 106 to the PAS Controller 901 over the data communications network. The portfolio allocation request is then received by the Network Server 102 and passed on the to PAS Controller 901 (step 218).

An example PHP/SQL command listing, illustrating substantive aspects of querying the PAS database for a client's current portfolio allocation is provided below:

```
<?PHP
header('Content-Type: text/plain');
mysql_connect("254.93.179.112",$DBserver,$password); // access
database server
mysql_select_db("CustomerProfile.SQL"); // select database table to
search
//create query for CustomerProfile data
$query = "SELECT fund_details FROM CustomerProfileTable WHERE
customer_ID LIKE
'%' $123abc" default_address LIKE '%' $address";
$result = mysql_query($query); // perform the search query
mysql_close("CustomerProfile.SQL"); // close database access
?>
```

The Client's current portfolio allocation information is then retrieved by the PAS Controller 901 from the Assets Database 919*e* of the PAS Database 919 (step 220).

Next, at step 222, the PAS Controller 901 generates style box grids and fund listings corresponding to the Client's current portfolio holdings. Non-limiting examples of the style box grid and portfolio fund listing are shown in and described in more detail below with respect to FIG. 8.

The style box and fund listings are organized into a suitable user interface (UI) and then transmitted to the Client Terminal 106 via the Network Server 102 (step 224). The Client Terminal 106 next receives the style box and fund listing interface (step 226) and displays the same on a visual display device thereof to the Client 106(*a*) (step 218). Non-limiting examples of the Style Box Grid and Fund Listing Interface are shown in and described in more detail below with respect to FIG. 8. The Client may interact with the Style Box Grid and Fund Listing Interface using any type of known or contemplated user input/output device connected to the Client Terminal 106.

Referring now to FIG. 3, the exemplary portfolio allocation selection process continues. When a Client is establishing an initial fund portfolio, the Client selects an initial fund allocations (step 302). The selection may be performed by making selections via the style box grid as presented to the Client via the Style Box Grid and Fund Listing Interface on the display device of the Client Terminal 106. When an entry is made to the style box grid, the funds listing may be changed to reflect the entry. Alternatively, or in addition thereto, the Client may enter the initial fund allocation via the fund listing as presented to the Client via the Style Box Grid and Fund Listing Interface on the display device of the Client Terminal 106. When an entry is made to the fund listing, the style box grid may be changed to reflect the entry. The Client may make additional and further entries to the style box grid or fund listing as desired.

Next, at step 304, the initial fund allocation established by the Client is sent to the PAS Controller 901 via the Network Server 102. In one embodiment, the client may provide the following example Login Request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
```

```
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>PAS.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <allocation_data>
        <FundName>FidelityMutualFund1</ FundName >
        <SharesPurchased>100</ SharesPurchased >
        <ShareValue>$100.00</ ShareValue >
        <PortfolioAllocation>10%</ PortfolioAllocation >
    </allocation_data>
</auth_request>
```

The initial funds allocations is received by the PAS Controller 901 (step 306), which, responsive thereto, requests current market information from the Trade Execution Server(s) 104 for the funds identified for the initial fund allocation (step 308). The market information may include the current bid and ask price, market volume, fund category and the like for each fund.

Next, at step 310, the current fund information is retrieved by the Trade Execution Server)s) 104.

An example PHP/SQL command listing, illustrating substantive aspects of querying the Trade Execution Servers for current fund values is provided below:

```
<?PHP
header('Content-Type: text/plain');
mysql_connect("254.93.179.112",$DBserver,$password); // access
database server
mysql_select_db("CurrentMutualFundValues.SQL"); // select database
table to search
//create query for CurrentMutualFundValue data
$query = "SELECT current_value FROM CurrentMutualFundValue
WHERE customer_ID
LIKE '%' $123abc" default_address LIKE '%' $address";
$result = mysql_query($query); // perform the search query
mysql_close("CurrentMutualFundValue.SQL"); // close database access
?>
```

The current fund information is then transmitted from the Trade Execution Server(s) 104 to the PAS Controller (step 312). The PAS Controller 901 then stores the current fund information in the PAS Database 919 (step 314).

An exemplary update to the records of the funds corresponding to the current fund information as stored in the PAS Database may take the following form:

```
<?PHP
header('Content-Type: text/plain');
// store input data in a database
mysql_connect("201.408.185.132",$DBserver,$password); // access database server
mysql_select("Funds_DB.SQL"); // select database to append
mysql_query("UPDATE FundsTable
SET fund_name = ETF1' , fund_type = 'Large Cap', fund_ask_price = '$100.00',
fund_bid_price = '$101.00' fund_volume = '100,000';
mysql_close("Funds_DB.SQL"); // close connection to database
?>
```

Next, at step 316, the client's initial fund allocation is updated by the PAS Controller 901 with the current fund information provided by the Trade Executions Server(s) 104. The updated fund information is then sent to the Client Terminal 106 (step 318) and displayed to the Client on the display device of the Client Terminal 106 (step 320).

Next, at step 322, when a Client is satisfied with an allocation, the Client may execute a trade order for the fund allocation. The trade order is transmitted to the PAS Controller 901 via the Network Server 102 (step 324). The PAS component responsively transmits trade orders based on the order as received from the Client to the Trade Execution Server(s) 104 (step 326). The Trade Execution Server(s) 104 then execute the trade order (step 328).

Referring now to FIG. 4, the exemplary portfolio allocation selection process continues with the Trade Execution Server(s) 104 transmitting a trade confirmation to the PAS Controller 901 (step 402) after the client's trade order has been successfully executed. The PAS Controller 901 updates the portfolio holdings of the Client with the trade confirmation information (step 404). The PAS Controller also transmits the trade confirmation to the Client Terminal 106 (step 406), where the trade confirmation and portfolio holdings are displayed to the Client (step 408).

Next, at step 410, the Client may enter a new portfolio allocation request to the style box grid. In one embodiment, the client may provide the following example Login Request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>PAS.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
```

```
        </client_details>
        <client_details> //Android Client with Webbrowser
            <client_IP>10.0.0.123</client_IP>
            <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
        </client_details>
        <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <new_allocation_data>
            <FundName>FidelityMutualFund2</ FundName >
            <SharesPurchased>50</ SharesPurchased >
            <ShareValue>$500.00</ ShareValue >
            <PortfolioAllocation>15%</ PortfolioAllocation >
        </new_allocation_data>
    </auth_request>
```

The new portfolio allocation request is transmitted to the PAS Controller 901 (step 412). Responsively thereto, the PAS Component calculates a new fund listing for the Client based on the new portfolio allocation request entered via the style box grid (step 414).

Next, at step 416, the new fund listing is sent to the Client Terminal by the PAS Controller 901. The new funds listing is then displayed to the client in the Style Box Gird and Fund Listing Interface (step 418).

Next, at step 418, the Client may enters a new portfolio allocation via the fund listing provided in the Style Box Grid and Fund Listing Interface. The new portfolio allocation based on the fund listing entry is then sent to the PAS Controller 901 (step 422). Responsively thereto, the PAS Controller 901 calculates a new style box allocation for the portfolio based on the fund listing entry (step 424).

The PAS Controller then transmits the new style box grid allocation to the Client Terminal (step 426). The new style box allocation is then displayed to the Client thereon (step 428). It should be noted that any number of new style box entries as in steps 410-418 above, or new fund listing entries as in steps 420-428 above, may be made by the Client using the Client Terminal 106. It should be further noted that any number of trade executions as described with respect to steps 324-328 above may be performed based on such style box grid or fund listing entries during the portfolio allocation process described herein.

Next, at step 430, the Client may establish investment goals for the entered portfolio allocations. The investment goals may relate to meeting a certain percentage gain within a particular timeframe, such as, for example, X % within in Y calendar quarters. The investment goals may also be made against a benchmark performance, such as but not limited to: portfolio gains must meet or exceed the performance of an established category of mutual funds for a given time period.

The Client-entered investment goals are transmitted to the PAS Controller 901 (step 432). The PAS Controller 901 then stores the Client's investment goals for later analysis and reporting (step 434). The exemplary portfolio allocation selection process described above with respect to FIGS. 2-4 then ends.

Turning now to FIGS. 5-6, therein are depicted a logic flow diagram illustrating embodiments of a portfolio allocation selection process performed between the Client Terminal 106 and the PAS Controller 901.

Commencing at step 502, the PAS Server 901 responds to a Client's login request and displays a login/create account screen 504 on Client Terminal 106. The Client responsively enters an input (step 506) comprising either a login request to an existing account, or a request to create a new account. At step 508, if the Client is requesting to create an account, the portfolio allocation selection process continues to step 510 below. If instead, the Client is requesting access to an existing account, the portfolio allocation selection process continues to step 520 below.

When the Client's entry comprises a request to create a new investment account, the PAS Controller 901 prepares and transmits a web form and fields for creating a new investment account (step 510). Such web form may include fields for entering a Client's name, social security number, address, contact information, a username, a password and/or any other useful identification information to associate with the investment account, as well as an existing financial account from which to transfer monetary funds to be used for the investment account.

Next, at step 512, the Client enters any requisite information in the displayed web form fields. The Client's inputs are then prepared for transmission to the PAS Controller 901 (step 514). The Client Terminal 106 confirms whether there are more web sections or forms to complete (step 516). If so, the portfolio allocation selection process returns to step 512 above. Otherwise, the portfolio allocation selection process continues to step 518, where the entered account information is transmitted to the PAS Controller 901 for storage in, for example, the maintained Account Database 919*a* and User Database 919*b*, as described in more detail later below.

From either step 508 or 518 above, the portfolio allocation selection process continues to step 520, wherein the PAS Controller 901 determines whether a login input has been received. If so, the portfolio allocation selection process continues to step 524 below. Otherwise, the process continues to an error handling routine (step 522), wherein the client may be given a limited number of attempts to enter a login input that corresponds to a valid stored investment account. If no valid login is presented within the given number of allowed attempts, the Client is denied access to the PAS Controller 901.

At step 524, the PAS Controller 901 determines whether a valid login input has been received, for example by comparing the received login input to data stored in the PAS Database 919. If the received login credentials are valid, the portfolio allocation selection process continues to step 526 below. Otherwise the process 500 returns to step 522 above.

At step 526, when valid login credentials have been received from the Client Terminal 106, the PAS Controller 901 retrieves account information for the investment account corresponding to the login credentials. The account information may be accessed, for example, from the Accounts Database 919*a*. The PAS Controller 901 then retrieves a style box/fund listing template (step 528) and populates the style box grid and fund listings based on the retrieved account information of the Client (step 530). An exemplary process for calculating style box allocations for a portfolio is described in more detail below with respect to FIG. 5A. It should be noted that where the Client is starting with a new account, there may be no established funds in the funds listing or style box grid at this stage of the process.

Next, at step 532, the Style Box grid and Fund Listing Interface is displayed on the Client Terminal 106. At step 534, the Client may enter a new portfolio allocation request via the style box grid.

Turning now to FIG. 5A, therein is depicted an exemplary process for calculating Style Box Allocations for a Client's portfolio in accordance with step 530 above. The process commences at step 530-1, where the Fund Allocation Component 940 of the PAS Controller 901 retrieves portfolio holdings of the Client from Accounts database 919*a* and determines the portfolio weight for each of the funds held by the Client in the Client's portfolio. The portfolio weight determined for each fund may be related to the percentage of the monetary value of the portfolio it represents.

Next, the Allocation Determination Component 942 of the PAS Controller 901 constructs a data representation of a matrix (designated "W") of the determined portfolio weights (step 530-2).

Next, at step 530-3, the Allocation Determination Component 942 retrieves, from the Funds database 919*f*, the percentage and/or value of the holdings within each fund with respect to each category of the style box allocations.

Next, at step 530-4, the Allocation Determination Component 942 constructs a data representation of a matrix (designated "A") of the style box allocations for the funds in the Client's portfolio using the data retrieved in step 530-3.

Next, at step 530-5, the Allocation Determination Component computes a matrix of current Style Box Allocations for the Client's portfolio as the dot product of the matrix W and the matrix A.

Finally, at step 530-6, each box (having a column/row coordinate that may be referenced as (x, y)) in the Style Box grid 804 is computed from the dot product computation of step 530-5 using weighted averages of the holdings. Each coordinate in the Style Box grid 804 is populated with the computed value prior to display of the Style Box grid 804 on the Client Terminal 106.

Referring now to FIG. 6, the portfolio allocation selection process continues at step 602, where the PAS controller 901 calculates a new portfolio allocations based on the Client's style box selection. An exemplary process for calculating portfolio weights based on client allocations is described in more detail below with respect to FIG. 6A.

The new allocations are then transmitted for display on the Client Terminal 106 (step 604). Next, at step 606, the client may enter new allocations to the style box grid or the portfolio listing. The new selection is transmitted to the PAS Controller 901, which responsively calculates new style box grid and fund portfolio listings based on the new entry (step 608). The new style box grid and fund listing is then transmitted to the Client Terminal 106 for display to the Client (step 610).

Next, at step 612, the Client Terminal determines whether the Client wishes to enter more allocations. If so, the portfolio allocation selection process returns to step 606 above. Otherwise, the portfolio allocation selection process continues to step 614, where the PAS Controller 901 places trade orders based on the allocations entered by the Client and the trade information is also stored, for example, in the Account Database 919*a*. An exemplary process for placing trade orders based on client allocations is described in more detail below with respect to FIG. 6B.

Upon receipt of a trade execution confirmation from the Trade Execution Server(s) 104 or the like, the PAS Controller 901 transmits the trade confirmation to the Client (step 616). The trade confirmation is then displayed to the Client on a display device of the Client Terminal 106 (step 618). The portfolio allocation selection process then concludes.

Turning now to FIG. 6A, therein is depicted an exemplary process for calculating portfolio weights based on client allocations in accordance with step 602 above. The process commences at step 602-1 where the UI transmits the Client's desired Style Box allocations and desired choices of available funds to the Allocation Determination Component 942.

Next, at step 602-2, the Allocation Determination Component 942 retrieves the current style box allocations for each of the desired funds from the Funds database 919*f*. The Allocation Determination Component 942 then determines whether the Client has selected more than one fund that corresponds to a given category, represented by a box in the Style Box grid 804 (step 602-3). If so, the process continues to step 602-4 below. Otherwise, the process continues to step 602-5.

Next, at step 602-4, where the Client has selected more than one funds for a given Style Box category, the Allocation Determination Component 942 creates, for the multiple selected funds, a composite fund with an average allocation for each style box category based on the holdings of the original funds.

Continuing from step 602-3 or step 602-4 above, the process continues to step 602-5 where the Allocation Determination Component 942 constructs a data representation of a matrix (designated "A") of fund allocations to each of the boxes of the Style Box grid 804.

Next, at step 602-6, the Allocation Determination Component 942 constructs a data representation of a matrix (designated "D") of the Client's desired allocation selections entered via the UI.

Next, at step 602-7, the Allocation Determination Component 942 computes a data representation of the inverse of matrix A (designated as AINVERSE or $A^{-1}$).

Next, at step 602-8, the Allocation Determination Component 942 computes a data representation of a Portfolio Weights Matrix (designated "W") resulting from a dot product of the matrix D and the matrix AINVERSE.

Finally, at step 602-9, for multiple funds mapped to the same box of the Style Box grid 804, the Allocation Determination Component 942 will equally divide the composite fund weights to determine original fund weights. The portfolio weights are then assembled prior to display on the Client Terminal 106 as described above in step 604.

Turning now to FIG. 6B, therein is depicted an exemplary process for placing trade orders based on client allocations in accordance with step 614 above. The process commences at step 614-1 where the Trade Execution Component 944 of the PAS Controller 901 receives Client-selected fund allocations from the UI of the Client Terminal 106.

Next, at step 614-2, the Trade Execution Component 944 retrieves existing Client fund allocations from Accounts database 919a. The Trade Execution Component 944 then iteratively performs the following sequential steps 614-3 to 614-8 for each fund in the Client's portfolio and the Client's new fund allocations as determined in response to a Style Box grid entry or portfolio listing entry from the UI of the Client Terminal 104.

The Trade Execution Component 944 selects the first or next fund in the Client's portfolio or desired allocations (step 614-3). The Trade Execution Component 944 determines whether the desired allocation for a fund equals an existing allocation in the Client's current portfolio. If so, the process returns to step 614-4 above to review a next fund, if any. In such case, no trade would be executed to fulfill the Client's new desired Style Box allocation of funds. If however, the new allocation does not equal the existing allocation, the process continues to step 614-5.

At step 614-5 the Trade Execution Component 944 determines whether the new desired allocation is greater than the existing execution. If so, the process continues to step 614-6, where the Trade Execution Component 944 generates a buy order for the given fund such that the portfolio weight of the fund in the resulting portfolio matches the desired Style Box allocation received from the Client Terminal 106. Otherwise, the process continues to step 614-7, where the Trade Execution Component 944 generates a sell order for the given fund such that the portfolio weight of the fund in the resulting portfolio matches the desired Style Box allocation received from the Client Terminal 106.

Next, at step 614-8, the Trade Execution Component 944 determines whether there are more funds to be processed based on the Client's desired allocations and the Client's existing portfolio. If so, the process returns to step 614-3 above. Otherwise, when all funds have been processed and appropriate trades executed, the process continues to step 614-9 where the buy orders and sell orders generated in response to the Client's desired allocations are placed by the Trade Execution Component 944. This may be accomplished by transmitting the trade orders electronically from the PAS Controller 901 to the trade Execution Server(s) 104.

Finally, upon confirmation of the trades made in response to the client's desired allocation, the Trade Execution Component 944 saves the trades and the resulting fund holdings in the portfolio to the Accounts database 919a in the account records of the Client. The Trade Execution Component 944 may then prepare to display the trade confirmation on Client Terminal 106, as described above with respect to step 616.

Turning now to FIGS. 7-8, therein are depicted screenshot diagrams illustrating embodiments of portfolio allocation selection screens presented to a Client on the Client Terminal 106 as generated with information transmitted by the PAS Controller 901.

FIG. 7 shows an exemplary screen shot 700 of an exemplary portfolio creation screen that may be presented to a Client during setup of a fund portfolio with the PAS Controller 901. The screen 700 may be presented, for example, during step 512 described previously above. The screen 700 may include a plurality of portfolio creation fields 702, which may include, but are not limited to, the following: a portfolio name, a portfolio theme, a comparative benchmark, a rebalancing frequency, an investment type and portfolio comments/notes. The entries in each such field may be selected by the Client as desired. The portfolio name may be any name as desired by a Client. The portfolio theme may be based on the type of funds that the Client wishes to own, such as one or more categories of funds (i.e., large-cap, mid-cap, small-cap, value funds, blended funds and growth funds). The benchmarking may represent an investment goal as determined by a client, such as matching a given stylebox category's performance or any other type of useful performance benchmarking. The rebalance frequency may be selected as desired by a Client at a point in time when allocations in the portfolio are to be evaluated and redistributed based on the portfolio's performance. Such rebalancing may take at any desired interval, such as one calendar quarter, one calendar year or the like. Upon entry of this information, the Client may then select allocations for the portfolio via the next screen 800.

Turning to FIG. 8, after portfolio creation is completed by the Client, an exemplary Style Box Grid and Fund Listing Interface screen 800 is generated and displayed to the Client on a display device of the Client Terminal 106. In addition to portfolio information entered by client in screen 702 above, the exemplary screen 800 may further include one or more style box grids 802, one or more portfolio dots 804, a portfolio fund identification field 806, a fund allocation % field 808, and a fund allocation amount field 810.

In various embodiments, the style box grid may be a two-dimensional grid having various levels of a first category of funds plotted along a first axis and various levels of a second category of funds plotted along a second axis. In the case where there are three types of the first category and three types of the second category, the style box grid may be presented as, for example, a 3×3 grid of boxes, with each box corresponding to a respective one of the first and second categories. Each box, in turn may display a percentage of the Client's portfolio that is allocated to the corresponding type of first and second categories. The style box grid may contain any number of grid boxes and corresponding categories In alternate embodiments, the style box grid may comprise a three-dimensional grid having various levels of a first category of funds along a first axis, various levels of a second category of funds along a second axis, and various levels of a third category of funds along a third axis, which may be presented as a three dimensional cube to the client on the display device of the Client Terminal 106. In the case where there are three types of the first category, three types of the second category, and three types of the third category, the style box grid may be presented as, for example, a 3×3×3 three-dimensional cube having twenty-seven selectable sub-cubes, each of which corresponds to a single one of the first, second and third categories of funds. Each sub-cube, in turn may display a percentage of the Client's portfolio that is allocated to the corresponding type of first, second and third categories. Other types of style box grid listings are readily contemplated, and need not be limited to square or cube shapes.

As shown in FIG. 8, two style box grids may be presented to the Client as part of the Style Box Grid and Fund Listing Interface. One of the two style boxes may represent an allocation of funds that is held by a benchmarking standard. In the example shown in FIG. 8, the benchmarking may be based on the current fund holdings of the S&P 500 GROWTH INDEX. The Client's portfolio may be represented by the second style box presented in the Style Box Grid and Fund Listing Interface. In this manner, the client may quickly select a portfolio allocation that matches a desired benchmarking standard.

The portfolio dots 804 may be points on the display that represents the focus point of the Client's current portfolio holdings, and which the Client may move with a user input/output device, such as a mouse or keyboard connected to the Client Terminal 106. By moving the portfolio dot 804, the Client may select one or more boxes of the style box grid and make entries thereto, for example, a percentage of the client's holdings that are to be dedicated to funds in the corresponding first and second category of funds. The Client may move the portfolio dots to any position within the style box grid and make entries thereto to achieve a desired portfolio allocation. It should be noted that the percentages displayed across all boxes of the style box grid should preferably add to 100%. If such allocations do not add up to 100% when the client is done making allocations, then the PAS Controller may determine that the unused portion of the Client's monetary balance be maintained as cash. Alternatively, the PAS Controller 901 may allocate the missing percentage in equal allocations across all boxes in the style box grid. Some other form of acceptable re-allocation of outstanding percentages may also be performed by the PAS Controller 901.

The fund listing portion 806 of the Style Box Grid and Fund Listing Interface is likewise shown in FIG. 8. The fund listing 806 may include a number of funds held in the Client's portfolio. These funds may be listed by fund name, fund type, fund symbols and corresponding fund categories. The fund categories will correspond to the fund categories along the various axes of the style box grid. The fund listing 806 may also include that percentage of the Client's portfolio represented by such named fund in a fund percentage field 808. The monetary value represented by such fund holdings may also be presented in a fund amount field 810. As with the style box grid, the percentage of all fund holdings should add up to 100%.

When the Client selects a portion of the style box grid or the fund listing for requesting a new portfolio allocation, the PAS Controller 901 is programmed to use various algorithms to automatically rebalance the Client's fund holdings in accordance with the Client's allocation request. In a simple exemplary case where there is a single fund per corresponding box in the style box grid, the PAS Controller may determine the percentage weights of the remaining boxes in the following manner:

Let $W=[w1, w2, \ldots, w9]$ be the Matrix of weights to be determined for each of the nine boxes in a 3×3 style box grid.

Let A=a 9×9 matrix of fund allocations to the Client's style box.

Let $D=[d1, d2, \ldots, d9]$ be the Matrix of a desired portfolio allocations.

Then $D=W*A$, where * represents the well-known Matrix Multiplication mathematical function. Therefore, $W=D*A^{-1}$, where $A^{-1}$ represents the Inverse of the Allocation Matrix.

In the more complex case, where there is more than one fund per box in the style box grid for the Client's portfolio, the PAS Controller will create a composite fund with equal allocations between the funds. The allocations of the composite fund may be, for example, the average of the allocations for the individual funds, or may be some other desired weighting function.

At a given point in time, Fund Allocations across the nine boxes of the 3×3 style boxes are known. The client may thereafter select one or more funds for addition to the Client's portfolio, with at least one fund aligned with the categories of a given style box. However, though a fund is aligned with a given box in the style box grid, this does not mean that the portfolio is to be 100% allocated to that fund. Instead, the PAS Controller 901 will find weights across all the funds in the portfolio to achieve the desired allocation.

PAS Controller

FIG. 9 shows a block diagram illustrating embodiments of a PAS controller 901. In this embodiment, the PAS controller 901 may serve to aggregate, process, store, search, serve, identify, instruct, generate, match, and/or facilitate interactions with a computer through Electronic Communications technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the PAS controller 901 may be connected to and/or communicate with entities such as, but not limited to: one or more users 106a from peripheral devices 106 (e.g., user input devices 911); an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The PAS controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 may be connected to the system bus. In another embodiment, the cryptographic processor, transceivers (e.g., ICs) 974, and/or sensor array (e.g., accelerometer, altimeter, ambient light, barometer, global positioning system (GPS) (thereby allowing PAS controller 901 to determine its location), gyroscope, magnetometer, pedometer, proximity, ultra-violet sensor, etc.) 973 may be connected as either internal and/or external peripheral devices 912 via the interface bus I/O 908 (not pictured) and/or directly via the interface bus 907. In turn, the transceivers may be connected to antenna(s) 975, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU 903 comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80×86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the PAS controller and beyond through various interfaces. Should processing requirements dictate a greater amount speed and/or capacity, distributed processors (e.g., see Distributed PAS below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the PAS may be achieved by implementing a microcontroller such as CAST's R8051XC2 microcontroller; Intel's MCS 51 (i.e., 8051 microcontroller); and/or the like. Also, to implement certain features of the PAS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the PAS component collection (distributed or otherwise) and/or features may be implemented via the microprocessor and/or via embedded components; e.g., via ASIC, coprocessor, DSP, FPGA, and/or the like. Alternately, some implementations of the PAS may be implemented with embedded components that are configured and used to achieve a variety of features or signal processing.

Depending on the particular implementation, the embedded components may include software solutions, hardware solutions, and/or some combination of both hardware/software solutions. For example, PAS features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the PAS features. A hierarchy of programmable interconnects allow logic blocks to be interconnected as needed by the PAS system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the PAS may be developed on regular FPGAs and then migrated into a fixed version that more resembles ASIC implementations. Alternate or coordinating implementations may migrate PAS controller features to a final ASIC instead of or in addition to FPGAs. Depending on the implementation all of the aforementioned embedded components and microprocessors may be considered the "CPU" and/or "processor" for the PAS.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the PAS thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the PAS controller is accessible through remote clients 233b (e.g., computers with web browsers) by users 106a. Network interfaces may employ connection protocols such as, but not limited to: direct connect, Ethernet (thick, thin, twisted pair 10/100/1000/ 10000 Base T, and/or the like), Token Ring, wireless connection such as IEEE 802.11a-x, and/or the like. Should processing requirements dictate a greater amount speed and/or capacity, distributed network controllers (e.g., see Distributed PAS below), architectures may similarly be employed to pool, load balance, and/or otherwise decrease/increase the communicative bandwidth required by the PAS controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user, peripheral devices 912 (e.g., input devices 911), cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the PAS controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 911 often are a type of peripheral device 912 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the PAS controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the PAS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the PAS controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RANI drives; solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the PAS component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the PAS controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the PAS controller to communicate with other entities through a communications network 913. Various communication protocols may be used by the PAS controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XD/IPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the PAS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the PAS database 919, operating systems, other program components, user interfaces, Web browsers, and/or the like.

Access to the PAS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the PAS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the PAS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the PAS enabled nodes. The combined application may be nugatory on systems employing standard Web browsers.

Mail Server

A mail server component 921 is a stored program component that is executed by a CPU 903. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the PAS. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the PAS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the PAS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the PAS component to engage in secure transactions if so desired. The cryptographic component facilitates the secure accessing of resources on the PAS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The PAS Database

The PAS database component 919 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the PAS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the PAS database is implemented as a data-structure, the use of the PAS database 919 may be integrated into another component such as the PAS component 935. Also, the database may be implemented as a mix of data structures, objects, and relational structures. Databases may be consolidated and/or distributed in countless variations (e.g., see Distributed PAS below). Portions of databases, e.g., tables, may be exported and/or imported and thus decentralized and/or integrated.

In one embodiment, the database component 919 includes several tables 919a-h:

An accounts table 919a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), account CreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 919b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a PAS);

An devices table 919c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 919d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 919e includes fields such as, but not limited to: assetID, accountID, userID, distributorAccountID, distributorPaymentID, distributorOnwerID, assetType, assetName, assetCode, assetQuantity, assetCost, assetPrice, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, and/or the like;

A funds table 919f includes fields such as, but not limited to: fundID, fundType, fundCategory1, fundCategory2, fundCategory3, fundBidPrice, fundAskPrice, fundLastPrice, fundVolume, and/or the like. The funds table may list current market information for funds that may be added to clients' portfolios.

An transactions table 919g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like. The transactions table may thus list all monetary and investment transactions needed to accomplish the functions described herein.

An traders table 919h includes fields such as, but not limited to: traderID, traderTaxID, traderName, traderContactUserID, accountID, issuerID, acquirerID, traderEmail, traderAddress, traderState, traderZIPcode, traderCountry, merchantAuthKey, traderIPaddress, portNum, traderURLaccessCode, traderPortNo, traderAccessPrivileges, traderPreferences, traderRestrictions, and/or the like. The traders table may list operators of Trade Execution Server(s) 104 and the like to execute market trades as described herein.

A market_data table 919j includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), for example, through Microsoft's Active Template Library and Dealing Object Technology's real-time toolkit Rtt.Multi.]

In one embodiment, the PAS Database 919 may interact with other database systems. For example, employing a distributed database system, queries and data access by search PAS Component 935 may treat the combination of the PAS Database, an integrated data security layer database as a single database entity (e.g., see Distributed PAS below).

In one embodiment, user programs may contain various user interface primitives, which may serve to update the PAS. Also, various accounts may require custom database tables depending upon the environments and the types of clients the PAS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-j. The PAS may be configured to keep track of various settings, inputs, and parameters via database controllers.

The PAS Database may communicate to and/or with other components in a component collection, including itself, and/or facilities of the like. Most frequently, the PAS database communicates with the PAS component, other program components, and/or the like. The database may contain, retain, and provide information regarding other nodes and data.

The PAS

The PAS component 935 is a stored program component that is executed by a CPU. In one embodiment, the PAS component incorporates any and/or all combinations of the aspects of the PAS that was discussed in the previous figures. As such, the PAS affects accessing, obtaining and the provision of information, services, transactions, and/or the like across various communications networks. The features and embodiments of the PAS discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the PAS's features and facilities, and in many cases reduce the costs, energy consumption/requirements, and extend the life of PAS's underlying infrastructure; this has the added benefit of making the PAS more reliable. Similarly, many of the features and mechanisms are designed to be easier for users to use and access, thereby broadening the audience that may enjoy/employ and exploit the feature sets of the PAS; such ease of use also helps to increase the reliability of the PAS. In addition, the feature sets include heightened security as noted via the Cryptographic components 920, 926, 928 and throughout, making access to the features and data more reliable and secure The PAS transforms portfolio allocation selection inputs, via PAS components (e.g., Fund Allocation Component, Allocation Determination Component, and Trade Confirmation Component), into trade orders and portfolio allocation confirmation outputs. The Fund Allocation Component 940 is a programmed component that retrieves a Client's current portfolio fund allocations from the PAS Database 919 and generate a style box grid and fund listing interface for presentation to the Client, as described hereinabove.

The Allocation Determination Component 942 is a programmed component of the PAS Controller 901 that responds to client portfolio allocation requests entered by the Client in the style box grid or fund listings displayed to the client. The Allocation Determination Component 942 uses the algorithms described previously above to rebalance a Client's portfolio in response to a portfolio allocation request entered by the Client.

The Trade Execution Component 944 may execute trades of mutual funds or ETFs that are selected to be placed into or sold from the Client's portfolio in response to a portfolio allocation request. The Trade Execution Component 944 may communicate instructions to Trade Execution Server(s) 104 for completing a trade of funds. The Trade Execution Component 944 may further generate trade confirmations upon receipt of the same from Trade Execution Server(s) 104. The Trade Execution Component may stores such trade data in the Account Database 919*a* of the PAS Controller 901. The Trade Execution Component 944 may further access and update the Funds Database 919*f,* Transactions Database 919*g,* Traders Database 919*h* and Market Feed Database 919*j* with the corresponding information pertaining to Client trades.

The PAS component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the PAS server employs a cryptographic server to encrypt and decrypt communications. The PAS component may communicate to and/or with other components in a component collection, including itself, and/or facilities of the like. Most frequently, the PAS component communicates with the PAS database, operating systems, other program components, and/or the like. The PAS may contain, communicate, generate, obtain, and/or provide program component, system, user, and/or data communications, requests, and/or responses.

Distributed PASs

The structure and/or operation of any of the PAS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the PAS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for PAS controller and/or PAS component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the PAS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Self-Directed Style Box Portfolio Allocation Selection Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the FIGS. and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a PAS individual and/or enterprise user, database configuration and/or relational model, data type, data transmission and/or network framework, syntax structure, and/or the like, various embodiments of the PAS, may be implemented that enable a great deal of flexibility and customization. For example, aspects of the PAS may be adapted. While various embodiments and discussions of the PAS have included Electronic Communications, however, it is to be understood that the embodiments described herein may be readily configured and/or customized for a wide variety of other applications and/or implementations.

What is claimed is:

1. A portfolio allocation selection apparatus, comprising:
 a memory;
 a component collection in the memory, including:
  a Fund Allocation Component, and
  an Allocation Determination Component,
 a processor disposed in communication with the memory, and configured to execute a plurality of processing instructions from the component collection stored in the memory,
  wherein the processor issues instructions from the Fund Allocation Component, stored in the memory, to:
   obtain current fund allocations of a fund portfolio of a client from a client account database;
   generate an interactive style box grid user interface corresponding to current fund allocations of the fund portfolio of the client, and a fund listing corresponding to the interactive style box grid;
   provide the interactive style box grid user interface and the fund listing to a display of a computing device of the client;
   receive an interactive allocation selection command from the computing device of the client, the interactive allocation selection command generated via at least one of the interactive style box grid user interface and the fund listing,
   wherein the interactive allocation selection command includes a selection of a location marker within the interactive style box grid user interface,
   wherein a selection in the interactive style box grid is configured to cause an update of the fund listing on the display, and
   wherein a selection on the fund listing on the display is configured to cause an update on the interactive style box grid;
  wherein the processor issues instructions from the Allocation Determination Component, stored in the memory, to:
  receive the interactive allocation selection command via the Fund Allocation Component,
  determine a portfolio rebalancing based on the interactive allocation selection command,
   determine an update to the interactive style box grid user interface and the fund listing corresponding to the portfolio rebalancing, and
   provide, to the display of the computing device of the client, the update to the interactive style box grid user interface and the fund listing.

2. The apparatus of claim 1, wherein the interactive allocation selection command is entered by a client via the interactive style box grid, and the Allocation Determination Component determines the update to the interactive style box grid and the fund listing based on the interactive allocation selection command.

3. The apparatus of claim 1, wherein the interactive allocation selection command is entered by a client via the fund listing, and the Allocation Determination Component determines the update to the interactive style box grid and the fund listing based on the interactive allocation selection command.

4. The apparatus of claim 1, wherein the interactive style box grid comprises a two-dimensional grid having various levels of a first category of funds along a first axis and various levels of a second category of funds along a second axis.

5. The apparatus of claim 4, wherein the interactive style box grid lists a percentage of a total allocation of the fund portfolio of the client in a box assigned to a level of the first category and a level of the second category.

6. The apparatus of claim 5, wherein the interactive style box grid comprises a plurality of boxes, each box assigned to one level of the first category and one level of the second category, and wherein the percentages of all the boxes add up to 100%.

7. The apparatus of claim 6, wherein the client enters the interactive allocation selection command by selecting one of the plurality of boxes and enters a percentage in the one of the plurality of boxes.

8. The apparatus of claim 1, wherein the interactive style box grid comprises a three-dimensional grid having various levels of a first category of funds along a first axis, various levels of a second category of funds along a second axis, and various levels of a third category of funds along a third axis.

9. The apparatus of claim 1, further comprising:
a Trade Execution Component,
the processor issues instructions from the Trade Execution Component, stored in the memory, to:
execute at least one fund trade based on the interactive allocation selection command; and
display a confirmation of the at least one fund trade on the display of the computing device of the client.

10. A non-transitory processor-readable medium storing processor-executable components, the components, comprising:
a component collection stored in the medium, including:
a Fund Allocation Component, and
an Allocation Determination Component,
wherein the Fund Allocation Component, stored in the medium, includes processor-issuable instructions to:
obtain current fund allocations of a fund portfolio of a client from a client account database;
determine an interactive style box grid corresponding to current fund allocations of the fund portfolio of the client, and a fund listing corresponding to the interactive style box grid;
provide the interactive style box grid and the fund listing to a display of a computing device of the client;
receive an interactive allocation selection command from the computing device of the client, the interactive allocation selection command generated via at last least one of the interactive style box grid and the fund listing on the display,
wherein the interactive allocation selection command includes a selection of a location marker within the interactive style box grid,
wherein a selection in the interactive style box grid is configured to cause an update of the fund listing on the display, and
wherein a selection on the fund listing on the display is configured to cause an update on the interactive style box grid;
wherein the Allocation Determination Component, stored in the medium, includes processor-issuable instructions to:
receive the interactive allocation selection command via the Fund Allocation Component,
determine a portfolio rebalancing based on the interactive allocation selection command,
determine an update to the interactive style box grid and the fund listing corresponding to the portfolio rebalancing, and
provide, to the display of the computing device of the client, the update to the interactive style box grid and the fund listing.

11. The non-transitory processor-readable medium of claim 10, wherein the interactive allocation selection command is entered by a client via the interactive style box grid, and the Allocation Determination Component determines the update to the interactive style box grid and the fund listing based on the interactive allocation selection command.

12. The non-transitory processor-readable medium of claim 10, wherein the interactive allocation selection command is entered by a client via the fund listing, and the Allocation Determination Component determines the update to the interactive style box grid and the fund listing based on the interactive allocation selection command.

13. The non-transitory processor-readable medium of claim 10, wherein the interactive style box grid comprises a two-dimensional grid having various levels of a first category of funds along a first axis and various levels of a second category of funds along a second axis.

14. The non-transitory processor-readable medium of claim 13, wherein the interactive style box grid lists a percentage of a total allocation of the fund portfolio of the client in a box assigned to a level of the first category and a level of the second category.

15. The non-transitory processor-readable medium of claim 14, wherein the interactive style box grid comprises a plurality of boxes, each box assigned to one level of the first category and one level of the second category, and wherein the percentages of all the boxes add up to 100%.

16. The non-transitory processor-readable medium of claim 14, wherein the client enters the interactive allocation selection command by selecting one of the plurality of boxes and enters a percentage in the one of the plurality of boxes.

17. The non-transitory processor-readable medium of claim 10, wherein the interactive style box grid comprises a three-dimensional grid having various levels of a first category of funds along a first axis, various levels of a second category of funds along a second axis, and various levels of a third category of funds along a third axis.

18. The non-transitory processor-readable medium of claim 10, further comprising: a Trade Execution Component,
the processor issues instructions from the Trade Execution Component, stored in the memory, to:
execute at least one fund trade based on the interactive allocation selection command; and
display a confirmation of the at least one fund trade on the display of the computing device of the client.

19. A processor-implemented portfolio allocation system, comprising:
memory storage means;
a Fund Allocation Component means, stored in the memory storage means, to:
obtain current fund allocations of a fund portfolio of a client from a client account database;
determine an interactive style box grid corresponding to current fund allocations of the fund portfolio of the client, and a fund listing corresponding to the interactive style box grid;

provide the style box grid and the fund listing to a display of a computing device of the client;

receive an interactive allocation selection command from the computing device of the client, the interactive allocation selection command generated via at last least one of the interactive style box grid and the fund listing on the display, wherein the interactive allocation selection command includes a selection of a location marker within the interactive style box grid, wherein a selection in the interactive style box grid is configured to cause an update of the fund listing on the display, and wherein a selection on the fund listing on the display is configured to cause an update on the interactive style box grid;

an Allocation Determination Component means, stored in the memory storage means, to:

receive the interactive allocation selection command via the Fund Allocation Component, determine a portfolio rebalancing based on the interactive allocation selection command, determine an update to the style box grid and the fund listing corresponding to the portfolio rebalancing, and provide, to the display of the computing device of the client, the update to the interactive style box grid and the fund listing.

20. The system of claim 19, wherein the interactive allocation selection command is entered by a client via the interactive style box grid, and the Allocation Determination Component determines the update to the interactive style box grid and the fund listing based on the interactive allocation selection command.

21. The system of claim 19, wherein the interactive allocation selection command is entered by a client via the fund listing, and the Allocation Determination Component determines the update to the interactive style box grid and the fund listing based on the interactive allocation selection command.

22. The system of claim 19, wherein the interactive style box grid comprises a two-dimensional grid having various levels of a first category of funds along a first axis and various levels of a second category of funds along a second axis.

23. The system of claim 22, wherein the interactive style box grid lists a percentage of a total allocation of the fund portfolio of the client in a box assigned to a level of the first category and a level of the second category.

24. The system of claim 23, wherein the interactive style box grid comprises a plurality of boxes, each box assigned to one level of the first category and one level of the second category, and wherein the percentages of all the boxes add up to 100%.

25. The system of claim 24, wherein the client enters the interactive allocation selection command by selecting one of the plurality of boxes and enters a percentage in the one of the plurality of boxes.

26. The system of claim 19, wherein the interactive style box grid comprises a three-dimensional grid having various levels of a first category of funds along a first axis, various levels of a second category of funds along a second axis, and various levels of a third category of funds along a third axis.

27. The system of claim 19, further comprising:

a Trade Execution Component means, stored in the memory storage means, to:

execute at least one fund trade based on the interactive allocation selection command; and display a confirmation of the at least one fund trade on the display of the computing device of the client.

28. A processor-implemented portfolio allocation method to transform allocation selection command into trade executions, comprising:

executing processor-implemented Fund Allocation Component instructions to:

obtain current fund allocations of a fund portfolio of a client from a client account database;

determine an interactive style box grid corresponding to current fund allocations of the fund portfolio of the client, and a fund listing corresponding to the interactive style box grid;

provide the interactive style box grid and the fund listing to a display of a computing device of the client;

receive an interactive allocation selection command from the computing device of the client, the interactive allocation selection command generated via at last least one of the interactive style box grid and the fund listing on the display, wherein the interactive allocation selection command includes a selection of a location marker within the interactive style box grid, wherein a selection in the interactive style box grid is configured to cause an update of the fund listing on the display, and wherein a selection on the fund listing on the display is configured to cause an update on the interactive style box grid;

executing processor-implemented Allocation Determination Component instructions to:

receive the interactive allocation selection command via the Fund Allocation Component, determine a portfolio rebalancing based on the interactive allocation selection command, determine an update to the style box grid and the fund listing corresponding to the portfolio rebalancing, and provide, to the display of the computing device of the client, the update to the interactive style box grid and the fund listing.

29. The method of claim 28, wherein the interactive allocation selection command is entered by a client via the interactive style box grid, and the Allocation Determination Component determines the update to the interactive style box grid and the fund listing based on the interactive allocation selection command.

30. The method of claim 28, wherein the interactive allocation selection command is entered by a client via the fund listing, and the Allocation Determination Component determines the update to the interactive style box grid and the fund listing based on the interactive allocation selection command.

31. The method of claim 28, wherein the style box grid comprises a two-dimensional grid having various levels of a first category of funds along a first axis and various levels of a second category of funds along a second axis.

32. The method of claim 31, wherein the interactive style box grid lists a percentage of a total allocation of the fund portfolio of the client in a box assigned to a level of the first category and a level of the second category.

33. The method of claim 32, wherein the interactive style box grid comprises a plurality of boxes, each box assigned to one level of the first category and one level of the second category, and wherein the percentages of all the boxes add up to 100%.

34. The method of claim 33, wherein the client enters the interactive allocation selection command by selecting one of the plurality of boxes and enters a percentage in the one of the plurality of boxes.

35. The method of claim 28, wherein the interactive style box grid comprises a three-dimensional grid having various levels of a first category of funds along a first axis, various levels of a second category of funds along a second axis, and various levels of a third category of funds along a third axis.

36. The method of claim 28, further comprising:
executing processor-implemented Trade Execution Component instructions to: execute at least one fund trade based on the interactive allocation selection command; and
display a confirmation of the at least one fund trade on the display of the computing device of the client.

37. A trade allocation method comprising,
obtaining current fund allocations of a fund portfolio of a client from a client account database;
determining an interactive style box grid corresponding to current fund allocations of the fund portfolio of the client, and a fund listing corresponding to the interactive style box grid;
providing the interactive style box grid and the fund listing to a display of a computing device of the client;
receiving an interactive allocation selection command from the computing device of the client, the interactive allocation selection command generated via at last least one of the interactive style box grid and the fund listing on the display, wherein the interactive allocation selection command includes a selection of a location marker within the interactive style box grid;
wherein a selection in the interactive style box grid is configured to cause an update of the fund listing on the display, and
wherein a selection on the fund listing on the display is configured to cause an update on the interactive style box grid;
determining a portfolio rebalancing based on the interactive allocation selection command,
determining an update to the interactive style box grid and the fund listing corresponding to the portfolio rebalancing, and
providing, to the display of the computing device of the client, the update to the interactive style box grid and the fund listing.

38. The method of claim 37, wherein the interactive allocation selection command is entered by a client via the interactive style box grid, and the Allocation Determination Component determines the update to the interactive style box grid and the fund listing based on the interactive allocation selection command.

39. The method of claim 37, wherein the interactive allocation selection command is entered by a client via the fund listing, and the Allocation Determination Component determines the update to the interactive style box grid and the fund listing based on the interactive allocation selection command.

40. The method of claim 37, wherein the style box grid comprises a two-dimensional grid having various levels of a first category of funds along a first axis and various levels of a second category of funds along a second axis.

41. The method of claim 40, wherein the interactive style box grid lists a percentage of a total allocation of the fund portfolio of the client in a box assigned to a level of the first category and a level of the second category.

42. The method of claim 41, wherein the interactive style box grid comprises a plurality of boxes, each box assigned to one level of the first category and one level of the second category, and wherein the percentages of all the boxes add up to 100%.

43. The method of claim 42, wherein the client enters the interactive allocation selection command by selecting one of the plurality of boxes and enters a percentage in the one of the plurality of boxes.

44. The method of claim 37, wherein the interactive style box grid comprises a three-dimensional grid having various levels of a first category of funds along a first axis, various levels of a second category of funds along a second axis, and various levels of a third category of funds along a third axis.

45. The method of claim 37, further, comprising:
executing at least one fund trade based on the interactive allocation selection command; and
displaying a confirmation of the at least one fund trade on the display of the computing device of the client.

46. A trade allocation apparatus comprising:
means for obtaining current fund allocations of a fund portfolio of a client from a client account database;
means for determining an interactive style box grid corresponding to current fund allocations of the fund portfolio of the client, and a fund listing corresponding to the interactive style box grid;
means for providing the interactive style box grid and the fund listing to a display of a computing device of the client;
means for receiving an interactive allocation selection command from the computing device of the client, the interactive allocation selection command generated via at last least one of the interactive style box grid and the fund listing on the display, wherein a selection in the interactive style box grid is configured to cause an update of the fund listing on the display, and wherein a selection on the fund listing on the display is configured to cause an update on the interactive style box grid;
means for determining a portfolio rebalancing based on the interactive allocation selection command,
means for determining an update to the interactive style box grid and the fund listing corresponding to the portfolio rebalancing, and
means for providing, to the display of the computing device of the client, the update to the interactive style box grid and the fund listing.

47. The apparatus of claim 46, wherein the interactive allocation selection command is entered by a client via the interactive style box grid, and the Allocation Determination Component determines the update to the interactive style box grid and the fund listing based on the interactive allocation selection command.

48. The apparatus of claim 46, wherein the interactive allocation selection command is entered by a client via the fund listing, and the Allocation Determination Component determines the update to the interactive style box grid and the fund listing based on the interactive allocation selection command.

49. The apparatus of claim 46, wherein the style box grid comprises a two-dimensional grid having various levels of a first category of funds along a first axis and various levels of a second category of funds along a second axis.

50. The apparatus of claim 49, wherein the interactive style box grid lists a percentage of a total allocation of the fund portfolio of the client in a box assigned to a level of the first category and a level of the second category.

51. The apparatus of claim 50, wherein the interactive style box grid comprises a plurality of boxes, each box assigned to one level of the first category and one level of the second category, and wherein the percentages of all the boxes add up to 100%.

52. The apparatus of claim 51, wherein the client enters the interactive allocation selection command by selecting one of the plurality of boxes and enters a percentage in the one of the plurality of boxes.

53. The apparatus of claim 46, wherein the interactive style box grid comprises a three-dimensional grid having various levels of a first category of funds along a first axis, various levels of a second category of funds along a second axis, and various levels of a third category of funds along a third axis.

54. The apparatus of claim 46, further, comprising:
means for executing at least one fund trade based on the interactive allocation selection command; and
means for displaying a confirmation of the at least one fund trade on the display of the computing device of the client.

\* \* \* \* \*